United States Patent
Alexandrov et al.

(10) Patent No.: US 11,734,331 B1
(45) Date of Patent: Aug. 22, 2023

(54) SYSTEMS AND METHODS TO OPTIMIZE SEARCH FOR EMERGING CONCEPTS

(71) Applicant: PEAKSPAN CAPITAL MANAGEMENT, LLC, New York, NY (US)

(72) Inventors: Philip Alexandrov, New York, NY (US); Philip Dur, Burlingame, CA (US); Vikas Kumar, Livingston, NJ (US)

(73) Assignee: PEAKSPAN CAPITAL MANAGEMENT, LLC, New York, NY (US)

( * ) Notice: Subject to any disclaimer, the term of this patent is extended or adjusted under 35 U.S.C. 154(b) by 0 days.

(21) Appl. No.: 18/162,024

(22) Filed: Jan. 31, 2023

Related U.S. Application Data

(60) Provisional application No. 63/311,742, filed on Feb. 18, 2022.

(51) Int. Cl.
  *G06F 16/35* (2019.01)
  *G06F 40/30* (2020.01)
  *G06F 40/20* (2020.01)
  *G06F 16/33* (2019.01)

(52) U.S. Cl.
  CPC ........ *G06F 16/355* (2019.01); *G06F 16/3334* (2019.01); *G06F 40/20* (2020.01); *G06F 40/30* (2020.01)

(58) Field of Classification Search
  CPC .... G06F 16/3334; G06F 16/355; G06F 40/20; G06F 40/30
  See application file for complete search history.

(56) References Cited

U.S. PATENT DOCUMENTS

| | | | | |
|---|---|---|---|---|
| 6,778,995 | B1 * | 8/2004 | Gallivan | G06F 16/93 707/999.102 |
| 9,002,848 | B1 * | 4/2015 | Peng | G06F 16/355 707/738 |
| 2005/0015366 | A1 * | 1/2005 | Carrasco | G06F 16/334 |
| 2005/0171948 | A1 * | 8/2005 | Knight | G06F 16/313 707/E17.084 |
| 2006/0106847 | A1 * | 5/2006 | Eckardt | G06F 16/3323 707/E17.093 |
| 2015/0205784 | A1 * | 7/2015 | Mese | H04L 51/216 704/9 |
| 2017/0323230 | A1 * | 11/2017 | Bailey | G06F 16/95 |

\* cited by examiner

*Primary Examiner* — Eric Yen
(74) *Attorney, Agent, or Firm* — Ansari Katiraei; Arman Katiraei; Sadiq Ansari

(57) ABSTRACT

Disclosed is a system and associated methods to optimize search in order to present emerging concepts that relate to a query for an established concept. The system extracts phrases from different content, generates a first cluster with a first set of phrases that contain a first common set of words and a second cluster with a second set of phrases that contain a second common set of words. The system clusters the first cluster and the second cluster to a cluster group based on a related word amongst the first and second set of phrases. The system receives a query for a particular word in the first common set of words, selects the cluster group based on the phrases in the first cluster of the cluster group having the particular word, and presents search results based on content that includes phrases in the second cluster of the cluster group.

20 Claims, 12 Drawing Sheets

601

| Phrase Id. 605 | Topic Id. 607 | Content Id. 609 | Phrase text 611 | Elements 613 | Tags 615 | Encoded values 617 | Similarity 619 |
|---|---|---|---|---|---|---|---|
| 3 | 12 | 100 | "demand for sustainable fuel" | {demand, sustainable, fuel} | {N,A,N} | {0.23, 0.35, 0.11} | 0.27 |

603

| Topic Id. 621 | Segment 623 | Encoded values 625 |
|---|---|---|
| 12 | "...demand for sustainable fuel increases as airline companies push to reduce their carbon footprint..." | {0.27, 0.11, 0.54} |

FIG. 6

SYSTEMS AND METHODS TO OPTIMIZE SEARCH FOR EMERGING CONCEPTS

CLAIM OF BENEFIT TO RELATED APPLICATIONS

This application claims the benefit of U.S. provisional application 63/311,742, entitled "Identification and Recognition of Emerging and Trending Concepts", filed Feb. 18, 2022.

TECHNICAL FIELD

The present disclosure relates generally to the field of search. Specifically, the present disclosure relates to systems and methods that optimize search for the identification and presentation of emerging concepts in the search results.

BACKGROUND

Prior art search engines determine the relevance of content based on the presence of search query terms in the content, the number and relevance of sites that link to the content, the popularity of the content, and/or geographic or temporal qualifiers. As a result, content that relates to emerging concepts is not presented or is not prioritized in the search results because such content has yet to gain wide acceptance in the public discourse and the public lexicon, lacks references to the search query terms, has not been viewed by large numbers of users, and/or may not be linked to by many sites or important sites. Accordingly, the prior art search engines do not prioritize the presentation of a new idea, technology, or other subject matter unless that new idea, technology, or other subject matter starts to trend or is explicitly referenced in the search query terms which indicates that the user is already aware of the new idea, technology, or other subject matter.

BRIEF DESCRIPTION OF THE DRAWINGS

FIG. 6 illustrates example data structures for a phrase encoding vector and a topic encoding vector in accordance with some embodiments presented herein.

DETAILED DESCRIPTION OF PREFERRED EMBODIMENTS

Figure 1:
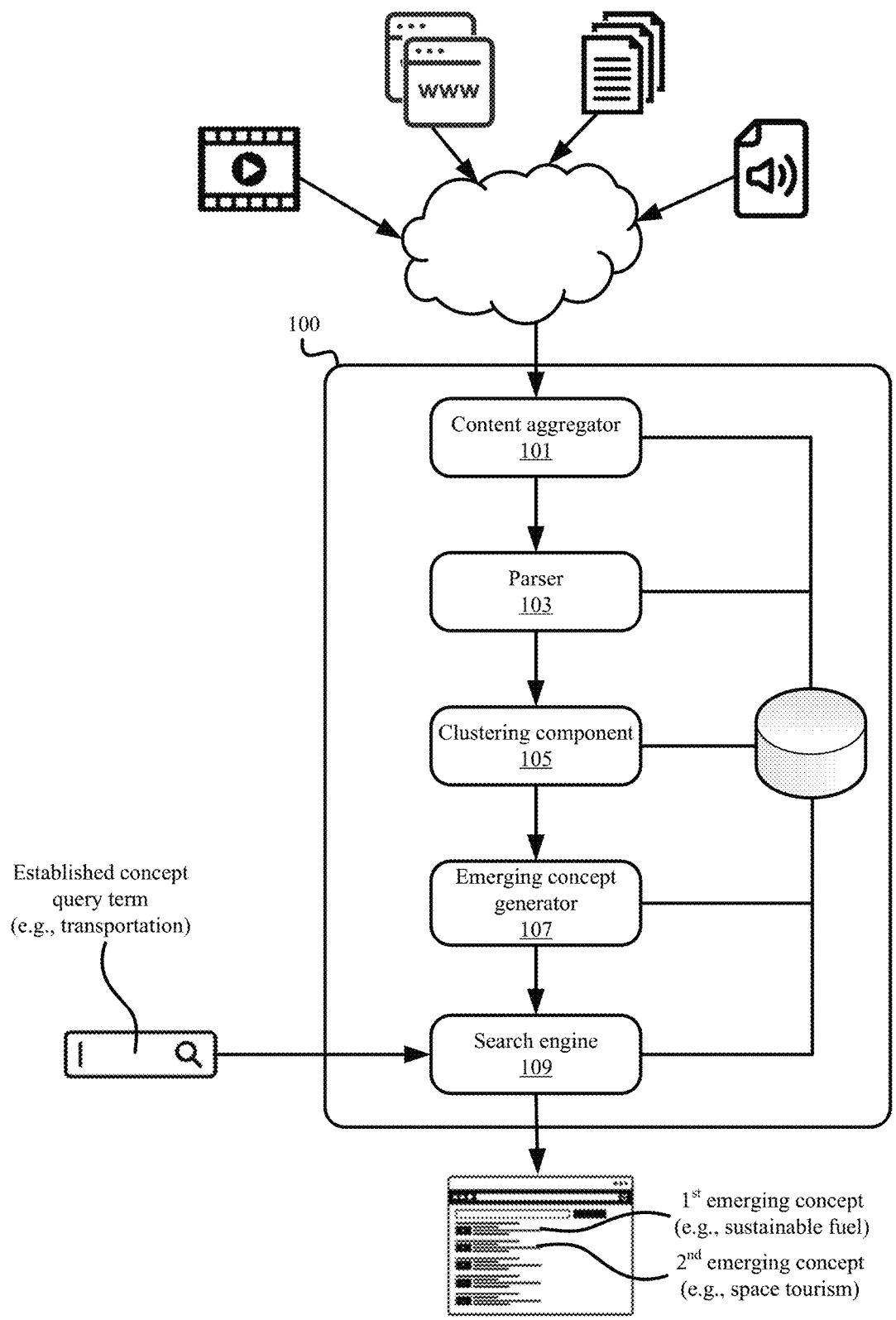
FIG. 1 illustrates an example architecture for an emerging concepts search system in accordance with some embodiments presented herein.

The following detailed description refers to the accompanying drawings. The same reference numbers in different drawings may identify the same or similar elements.

Provided are systems and methods that optimize search for emerging concepts. Specifically, an emerging concepts search system implements a search methodology that scours network-accessible content, determines relevance and/or relationships between content for established concepts and emerging concepts, and produces search results that presents content, relevant entities, and/or other materials for emerging concepts in response to a search query involving a term for an established concept.

Content for established concepts includes publications, periodicals, blogs, research documents, images, videos, audio, podcasts, articles, academic papers, and/or other network-accessible content that describe or mention recognized, accepted, popular, trending, known, and/or commonly referenced technologies, topics, themes, subjects, or terms. Conversely, content for emerging concepts includes publications, periodicals, blogs, research documents, images, videos, audio, podcasts, articles, academic papers, and/or other network-accessible content that describe or mention technologies, topics, themes, subjects, or terms that are not widely recognized, accepted, popular, trending, known, and/or commonly referenced. In other words, the descriptive elements for the emerging concepts have not gained wide acceptance in the public discourse and the public lexicon, and the content for a particular emerging concept is limited to a few publications that has not been viewed or linked to by a large number of users or sites to establish that content's relevance in prior art search engines.

The emerging concepts search system produces search results that identify and track new products, services, solutions, and entities for technologies, topics, themes, subjects, and/or terms related to emerging concepts based on machine-generated relationships between the emerging concepts and established concepts. For instance, before "ride-sharing" became a known and accepted concept, the emerging concepts search system would identify "ride-sharing" as an emerging concept based on one or a few nascent publications around that emerging concept, and those publications would be presented as relevant search results for the established concept of "transportation" or for a search query that includes the single word of "transportation" based on relationships created between the emerging concept of "ride-sharing" and the established concept of "transportation" by the emerging concepts search system. Similarly, before "metaverse" became a known and accepted concept, the emerging concepts search system would identify "metaverse" as an emerging concept based on one or the first articles around that emerging concept, and those articles would be presented as relevant search results for the established concept of "virtual reality" or for a search query on "virtual reality" based on relationships created between the emerging concept of "metaverse" and the established concept of "virtual reality" by the emerging concepts search system. Moreover, the emerging concepts search system identifies the relevant entities associated with each emerging concept to supplement the search results and allow users to explore the emerging concepts further and focus subsequent searches on the relevant entities and content associated with the emerging concepts.

FIG. 1 illustrates an example architecture for emerging concepts search system 100 in accordance with some embodiments presented herein. Emerging concepts search system 100 includes content aggregator 101, parser 103, clustering component 105, emerging concept generator 107, and search engine 109. These components represent processes and/or devices that are implemented by emerging concepts search system 100 in order to determine the relevance of emerging concepts, establish relationships between emerging concepts and established concepts, and produce the emerging concepts search results.

In some embodiments, emerging concepts search system 100 may include more or less components. For instance, two or more of the components may be merged and implemented as a single process or as a single module of emerging concepts search system 100.

Emerging concepts search system 100 and the associated components are implemented using one or more devices or machines with processing, memory, storage, network, and/or other hardware resources. These components operate to collectively generate the emerging concepts search results in response to queries submitted from user devices over a data network. The one or more devices or machines may be supplemented with various databases or data stores, and may be network-accessible in order to receive the queries and to provide the relevant content and/or data for the emerging concepts that are associated with the established concepts identified in the queries.

Content aggregator 101 includes one or more web crawlers that retrieve different forms of content from different network nodes, sites, and/or hosts. The retrieved content includes web sites, publications, periodicals, blogs, research documents, images, videos, audio, podcasts, academic papers, and/or other data containing information about established and emerging concepts.

Content aggregator 101 may be configured with a set of Uniform Resource Locators ("URLs"), network addresses, and/or access credentials to target specific nodes, sites, and/or hosts via a data network, and to scrape, download, or otherwise obtain the content from the specific nodes, sites, and/or hosts. Content aggregator 101 may use HyperText Transfer Protocol ("HTTP"), Application Programming Interface ("API") calls, and/or network messaging to source the content from the targeted destinations. Content aggregator 101 runs continuously or periodically to obtain updated content as it becomes available and/or to delete older content that has been updated or replaced with newer content.

Parser 103 executes on the retrieved content to differentiate between relevant and items in the retrieved content. Relevant items include text that describes or discusses new technologies, topics, or concepts, whereas irrelevant items include text that relate to conferences, mergers, acquisitions, purchases, new contracts, new customers, personnel changes, financial statements, and/or information related to company events rather than the technologies, topics, or concepts being developed by the companies. Irrelevant items further include advertisements, banners, stock images, and interactive selectable user interface elements.

For textual content, parser 103 uses regular expressions, Natural Language Processing ("NLP") techniques, and image processing techniques to differentiate between the relevant and irrelevant items within the content. For instance, the regular expressions, NLP techniques, and image processing techniques are used to differentiate between the body or subject text (e.g., relevant text) and menus, advertisement, and other extraneous text (e.g., irrelevant text).

In some embodiments, parser 103 includes an NLP classifier that is trained to detect text describing new or emerging technologies, topics, and/or other concepts from other text. For instance, the NLP classifier is trained based on search queries, content from social media sites, and/or input data to build dictionary of trending, known, existing, and/or other recognized terms or phrases and of new, relatively unknown, and/or other unrecognized terms or phrases based on the frequency or number of different content where those terms or phrases are found. The NLP classifier may also perform industry or technology specific queries using those terms or phrases to determine if a relationship exists between those terms or phrases and one or more industries or technologies. For instance, the terms "mixed reality" and "augmented reality" may be known or recognized terms or phrases that are related to the "virtual reality" technology field based on numerous references to those terms or phrases, whereas "metaverse" may be an unknown or unrecognized term or phrase that is related to the "virtual reality" technology field based on the analyzed "virtual reality" content having a fractional number of references to "metaverse" than to "mixed reality" and "augmented reality" or the term "metaverse" only appearing in content that was published in the last 2 days and was not seen in content that was published more than 2 days prior.

For multimedia content that includes audio, parser 103 performs a speech-to-text translation of the audio, and applies the regular expressions, NLP techniques, and image processing techniques to the transcribed audio in order to determine the content's relevance based on whether the transcribed text for the audio describes or discusses new technologies, topics, or concepts. For multimedia content that includes images or video, parser 103 uses one or more image recognition techniques to generate textual descriptions of the image or video subject, object, and/or action, and applies the regular expressions, NLP techniques, and image processing techniques to determine the relevance of the content to new technologies, topics, or concepts.

Parser 103 extracts the relevant items from the retrieved content, and stores the relevant items and/or copies of the retrieved content containing the relevant items in a database of emerging concepts search system 100. Retrieved content that does not include a relevant item is discarded.

Figure 2:
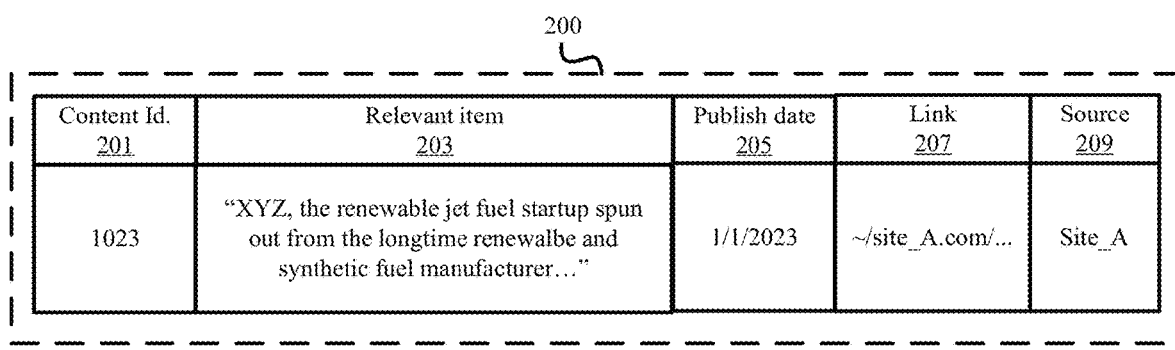
FIG. 2 illustrates an example database record for a content instance that contains one or more relevant items in accordance with some embodiments presented herein.

FIG. 2 illustrates an example of the data that is stored in database record 200 for a content instance that contains one or more relevant items in accordance with some embodiments presented herein. Specifically, parser 103 analyzes the content instance, and identifies a textual passage (e.g., a paragraph, one or more sentences, a sentence clause, a phrase, etc.) within the content instance with words or terms associated with a technology, topic, or concept of interest.

Database record 200 stores unique identifier 201, relevant item 203 (e.g., text, image, etc.) that is extracted from the content instance, publication date 205, link 207 to the content instance that may include other extraneous text and/or irrelevant items, and source 209 identifying the publishing entity. In some embodiments, database record 200 stores or is associated with metadata that provides additional information about the relevant content.

Parser 103 is defined with a segmentation model for classifying the one or more topics associated with each extracted relevant item. Specifically, parser 103 uses the segmentation model to divide the extracted relevant items into topic-wise passages or segments. In some embodiments, the segmentation model is trained to maximize the likelihood that each sentence in a topic-wise segment relates to the same topic by providing training sentences that contain different references or wording describing the same topic. For instance, the segmentation model corresponds to a Long Short-Term Memory ("LSTM") neural network or a transformer-based model that analyzes sentences from the same source content to determine which sentences relate to a common topic, and to group the sentences that relate to a common topic into the same topic-wise segment.

Figure 3:
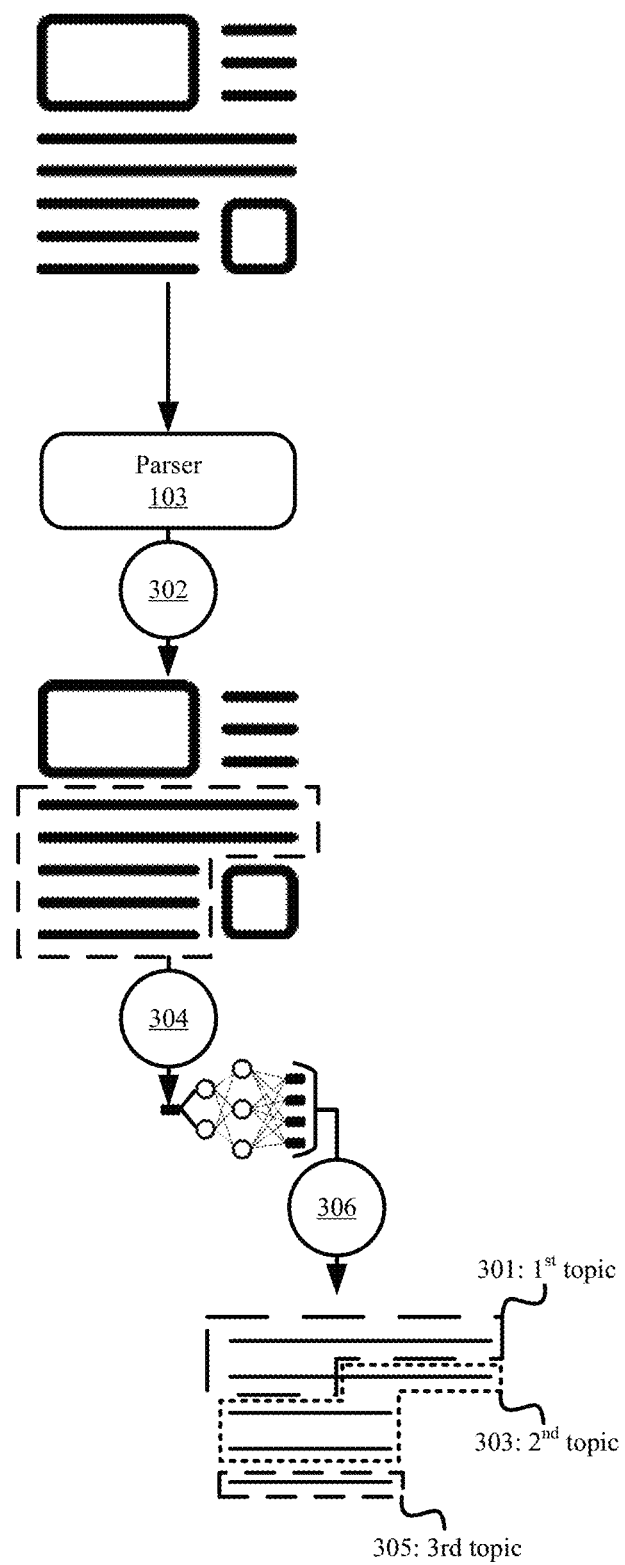
FIG. 3 illustrates an example of topic-wise segmentation of text in accordance with some embodiments presented herein.

FIG. 3 illustrates an example of topic-wise segmentation of text performed using the segmentation model in accordance with some embodiments presented herein. Parser 103 extracts (at 302) a passage (e.g., paragraphs extracted from relevant content) with one or more words or terms relating to sought-after technologies, fields, topics, or concepts from aggregated content, inputs (at 304) the passage into the segmentation model, maps the sentences, phrases, and/or wording from the passage to different topics that the segmentation model has been trained to recognize, and segments (at 306) the passage into different segments 301, 303, and 305 for the topic that was identified based on the wording within each segment. A segment may include one or more sentences of the passage or one or more clauses within a sentence. For instance, a sentence with two clauses that reference different topics may be partitioned into two segments.

In some embodiments, the segmentation model may provide each segment with a label or identifier for the classified topic. For instance, a first topic-wise segment may be classified and labeled with the "aviation" tag, and a second topic-wise segment may be classified and labeled with the "artificial intelligence" tag. In some embodiments, the segmentation model may classify a segment as relating to two or more different topics.

Parser 103 extracts noun-phrases, verb-phrases, and/or combinations of noun and verb phrases from each topic-wise segment using a constituency parser. The constituency parser generates a parse tree for each segment. The parse tree represents the syntactic structure of the segment according to a phrase structure grammar. Specifically, the parse tree partitions a sentence as different noun and verb phrases are detected within the sentence with each phrase becoming a branch or node of the parse tree. A noun-phrase includes one or more nouns that are defined consecutively in a segment, and may include an adjective in the segment that relates to the one or more nouns. A noun-phrase may represent a candidate concept, because the noun-phrase is either a subject or object in a sentence.

Figure 4:
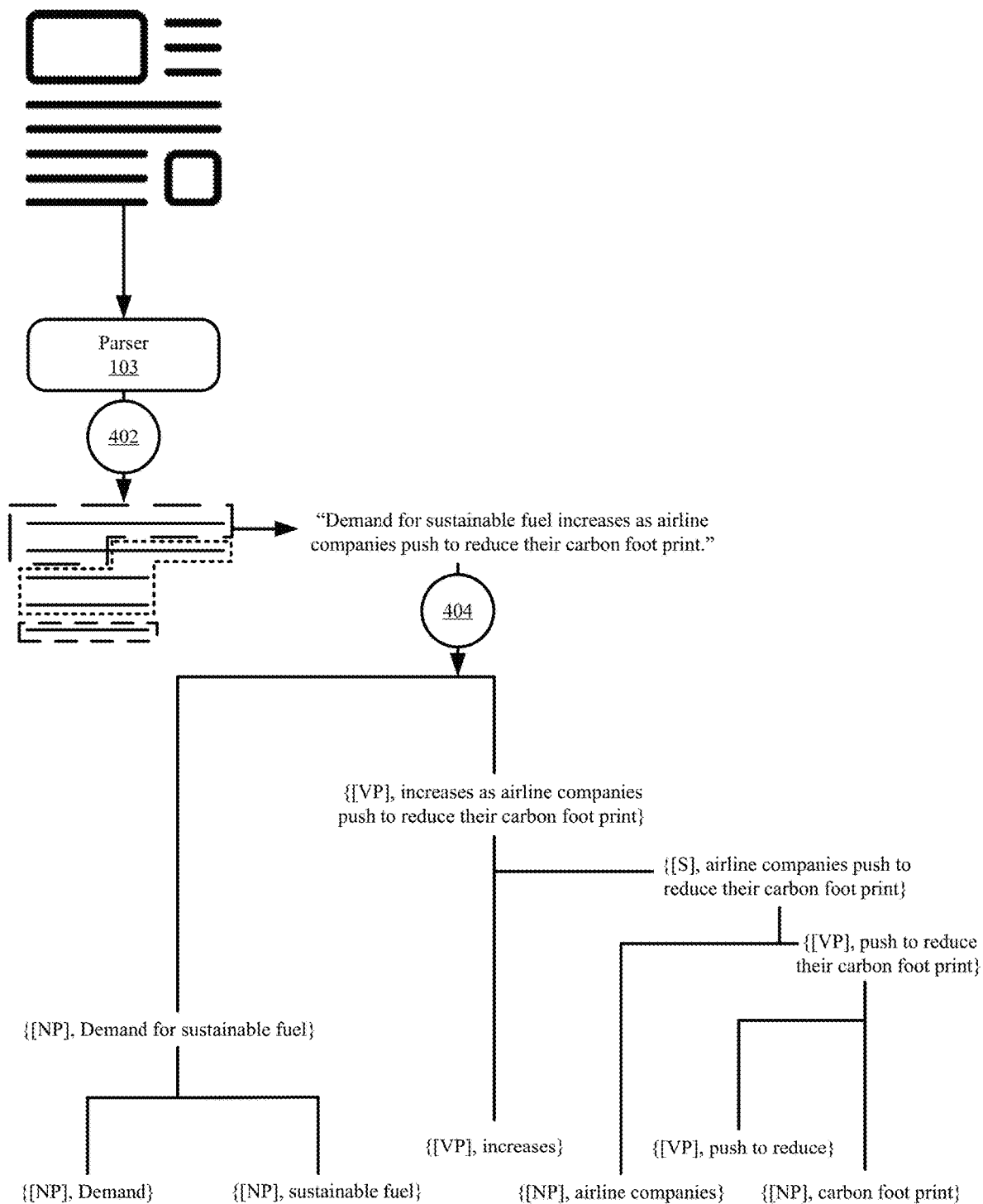
FIG. 4 illustrates an example of a parse tree deconstruction of a topic-wise segment in accordance with some embodiments presented herein.

FIG. 4 illustrates an example of a parse tree deconstruction of a topic-wise segment for extracting the noun-phrases and verb-phrases from the topic-wise segment in accordance with some embodiments presented herein. Parser 103 identifies and extracts (at 402) a topic-wise segment from relevant text of retrieved content. In this example, the topic-wise segment is a single sentence. Parser 103, via the constituency parser, deconstructs (at 404) the sentence by creating different branches of the parse tree upon detecting each noun-phrase or verb-phrase within the sentence.

Following the phrase extraction, parser 103 executes a language encoder model to generate one or more vector representations for each topic-wise segment and its extracted phrases. In some embodiments, the language encoder model generates a topic encoding vector for each topic-wise segment, and a phrase encoding vector for the extracted phrases of that segment.

Each vector is represented as an array of numerical values. In some embodiments, the language encoder model is pre-trained on a contrastive paraphrasing objective such that the encodings of similar passages or phrases have a higher similarity score. In particular, a higher score is provided for a topic and nouns of a passage with meanings that are closer in a vector space (e.g., have a related or similar definition), and a lower score is provided for a topic and nouns of a passage with meaning that are further in the vector space (e.g., have an unrelated or dissimilar definition). Accordingly, the topic encoding vector for a particular topic-wise segment is defined with one or more values that represent the similarity or relevance of the phrases extracted from that particular topic-wise segment to the identified topic for that particular topic-wise segment. The phrase encoding vector for a particular noun-phrase is defined with one or more values that represent the similarity or relevance of each noun from the particular noun-phrase to one another and/or to the topic of the topic-wise segment that the particular noun-phrase was extracted from.

Figure 5:
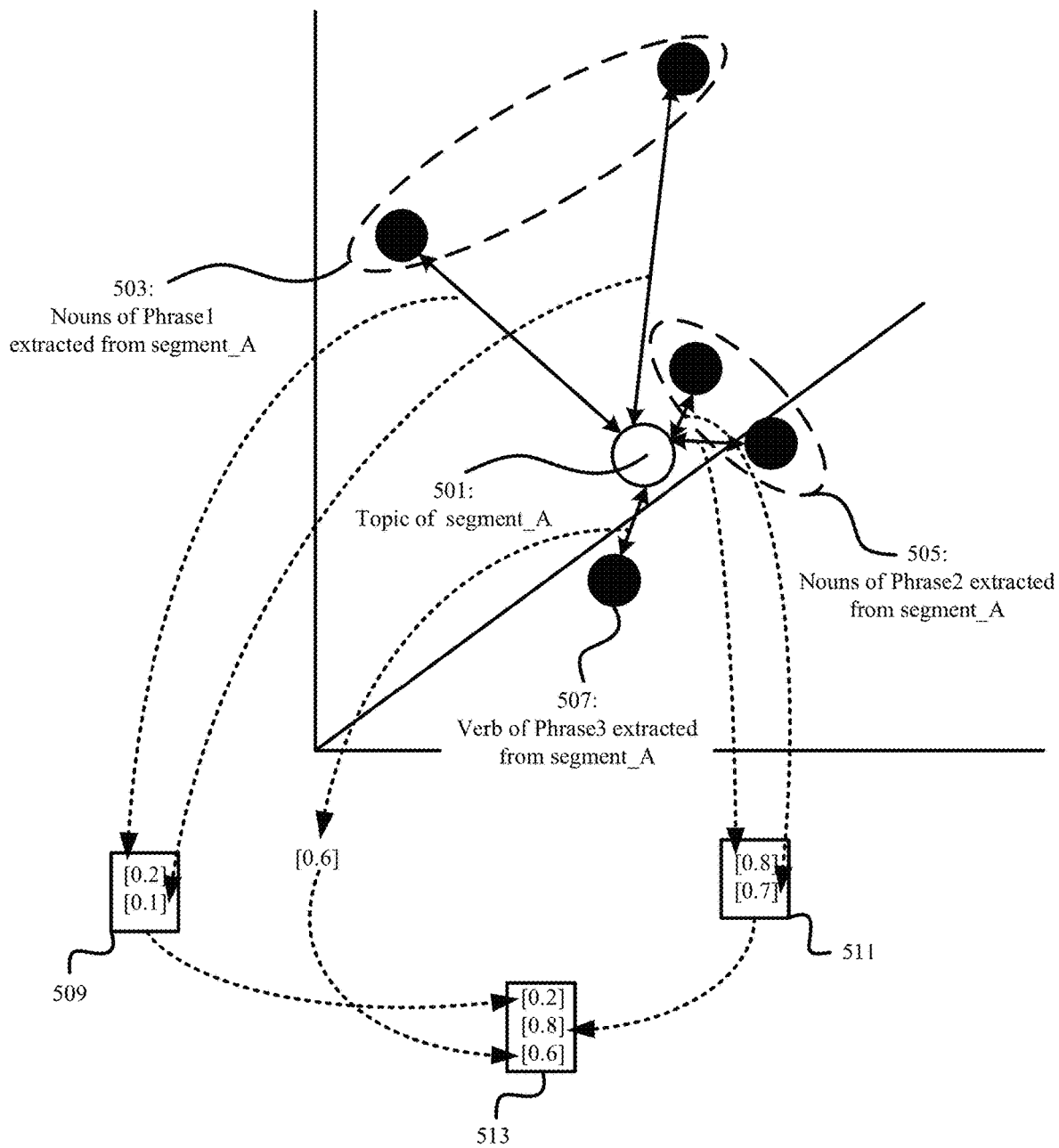
FIG. 5 illustrates an example of encoding the topic encoding vector and phrase encoding vector for a topic-wise segment and its constituent phrases in accordance with some embodiments presented herein.

FIG. 5 illustrates an example of encoding the topic encoding vector and phrase encoding vector for a topic-wise segment and its constituent phrases in accordance with some embodiments presented herein. A vector space illustrates an example mapping for the definitional similarity between topic 501 of a topic-wise segment and nouns and verbs of phrases 503, 505, 507 that are extracted from that topic-wise segment. In other words, the positioning of the nouns and verbs in the vector space relative to positioning of topic 501 is determined according to the semantic similarity or relational similarity between the nouns and verbs to topic 501.

The values for the phrase encoding vector of each phrase 503, 505, and 507 are derived based on the distances representing the similarity or dissimilarity between each noun or verb of that phrase and topic 501. For instance, noun-phrase 503 includes 2 nouns that are definitionally unrelated or semantically dissimilar to topic 501. Accordingly, the representations of the nouns from noun-phrase 503 in the vector space are the furthest from topic 501 than other nouns or verbs of phrases 505 and 507, and the values representing the nouns of noun-phrase 503 in the phrase encoding vector 509 of noun-phrase 503 are lesser than the values attributed to nouns or verbs of other phrases 505 and 507 because of the semantic dissimilarity. Conversely, noun-phrase 505 includes 2 nouns that have the closest meaning or semantic similarity to topic 501. Accordingly, the representations of the nouns from noun-phrase 505 in the vector space are closest to topic 501 than other nouns or verbs of other phrases 503 and 507, and the values representing the nouns of noun-phrase 505 in the phrase encoding vector 511 of noun-phrase 505 are greater than the values attributed to nouns or verbs of other phrases 503 and 507 because of the semantic similarity.

Emerging concepts search system 100 generates topic encoding vector 513 for the topic-wise segment based on the definitional or semantic similarity of each phrase to topic 501. For instance, topic encoding vector 513 includes a value for each phrase 503, 505, and 507 that is extracted from the topic-wise segment and that is derived based on the relatedness of the nouns and/or verbs of each phrase to topic 501 identified for that topic-wise segment. The topic encoding vector 513 values may be derived via an averaging, weighted averaging, cosine similarity, or other calculation involving the phrases 503, 505, and 507 and topic 501.

The vectors generated by the language encoder model are stored in a database of emerging concepts search system 100. In some embodiments, the vectors are stored in conjunction with other data structures or records created for the same phrase or topic-wise segment.

FIG. 6 illustrates example data structures for a phrase encoding vector and a topic encoding vector in accordance with some embodiments presented herein. FIG. 6 includes data structure 601 for the phrase encoding vector of a phrase (e.g., noun-phrase, verb-phrase, or noun and verb phrase combination) that is extracted from a topic-wise segment, and data structure 603 for the topic encoding vector of the topic-wise segment.

Data structure 601 includes phrase identifier 605 for the represented phrase that is extracted from a topic-wise segment, topic identifier 607 for the topic or the topic-wise segment that the phrase was extracted from or is associated with, content identifier 609 for the content that contains the noun-phrase identified by phrase identifier 605 and that contains the topic-wise segment identified by topic identifier 607, phrase text 611, phrase elements 613, tags 615 classifying each phrase element, values 617 quantifying the semantic relation between each phrase element to the topic of the topic-wise segment, and similarity score 619 for the semantic relation between the entire phrase and the topic of the topic-wise segment. In some embodiments, similarity score 619 is calculated based on the average or weighted average of values 617 for each phrase component. In some embodiments, similarity score 619 is calculated based on the cosine similarity between the phrase elements 613 and the topic of the topic-wise segment.

Data structure 603 includes topic identifier 621 for the topic or topic-wise segment represented by data structure 603, segment data 623 (e.g., text or one or more relevant items of the topic-wise segment), and topic encoding vector 625 for the semantic relation between the topic of the topic-wise segment and its constituent phrases.

Emerging concepts search system 100 uses the generated vectors to identify and select the relevant phrases for a topic. Specifically, emerging concepts search system 100 differentiates relevant phrases from irrelevant phrases that have been extracted from the different topic-wise segments based on the values and/or scoring associated with the associated phrase encoding vectors and topic encoding vectors. For instance, if the values encoded for a particular phrase are below a given threshold, then the particular phrase is discarded or is deemed an irrelevant phrase that is not later used determine commonality and/or relationships between common phrases and different topics and develop links between established concepts and emerging concepts. Emerging concepts search system 100 determines the commonality and/or relationships and links concepts by clustering the relevant phrases (e.g., the phrases with encoded vector values that satisfy or exceed the particular threshold). In some embodiments, emerging concepts search system 100 determines the relevance of the phrases of a topic-wise segment to the classified topic of that segment based on the encoded values that are derived for the topic encoding vector from the cosine similarity of the phrase encoding vectors created for those constituent phrases.

Clustering component 105 performs the clustering of the relevant phrases (e.g., phrases that generated encoded vector values satisfying or exceeding the particular threshold) in order to determine the commonality and/or relationships between common phrases and different topics, and to develop the links between established concepts and emerging concepts based on the determined commonality and/or relationships. Clustering component 105 generates a directional graph from the relevant phrases extracted for a particular topic or topic-wise segments classified to the particular topic.

Clustering component 105 defines nodes of the directional graph based on the unique set of lemmatized words that occur in the relevant phrases of a common topic. For instance, the nodes of a directional graph for a particular topic are generated based on different nouns, verbs, or other words from phrases that are extracted from different topic-wise segments classified to that particular topic.

Clustering component 105 connects or links nodes that correspond to nouns of the same noun-phrase and/or other consecutive or sequential words of a particular phrase. Clustering component 105 attributes a value to each edge that connects or links two nodes. Clustering component 105 increments the value for an edge of a particular noun-phrase based on the number of noun-phrases in the collection (e.g., noun-phrases from the same topic-wise segment or different topic-wise segments classified to the same topic) that include the same nouns as the particular noun-phrase in the same sequence or order. In some embodiments, the value of a particular edge represents the set of phrase identifiers that contain the nouns represented by that particular edge.

Clustering component 105 traverses the paths of the directional graph to identify valid paths that represent relevance of noun-phrases on the basis of usage frequency. A path includes two or more nodes of the directional graph that are connected together with one or more edges.

A valid path is a path in which the values defined for the edges of that path satisfy or exceed a threshold. More specifically, a valid path is defined as a path where the intersection of all edge values is a set with a size greater than a certain threshold value and that contains a node that represents a word that occurs most frequently in text as a noun or proper noun. In other words, a valid path is a sequence of words that occur in the extracted phrases at least a threshold number of times and at least one of the words is a noun or a proper noun.

Clustering component 105 sets the threshold for the valid path detection based on the occurrences of word sequences that are relevant to the use case. For instance, the threshold for the valid path detection may be defined based on the distribution of edge values within the directional graph. In some embodiments, the threshold is set based on the number of extracted phrases, topics, and/or content used for the analysis.

Figure 7:
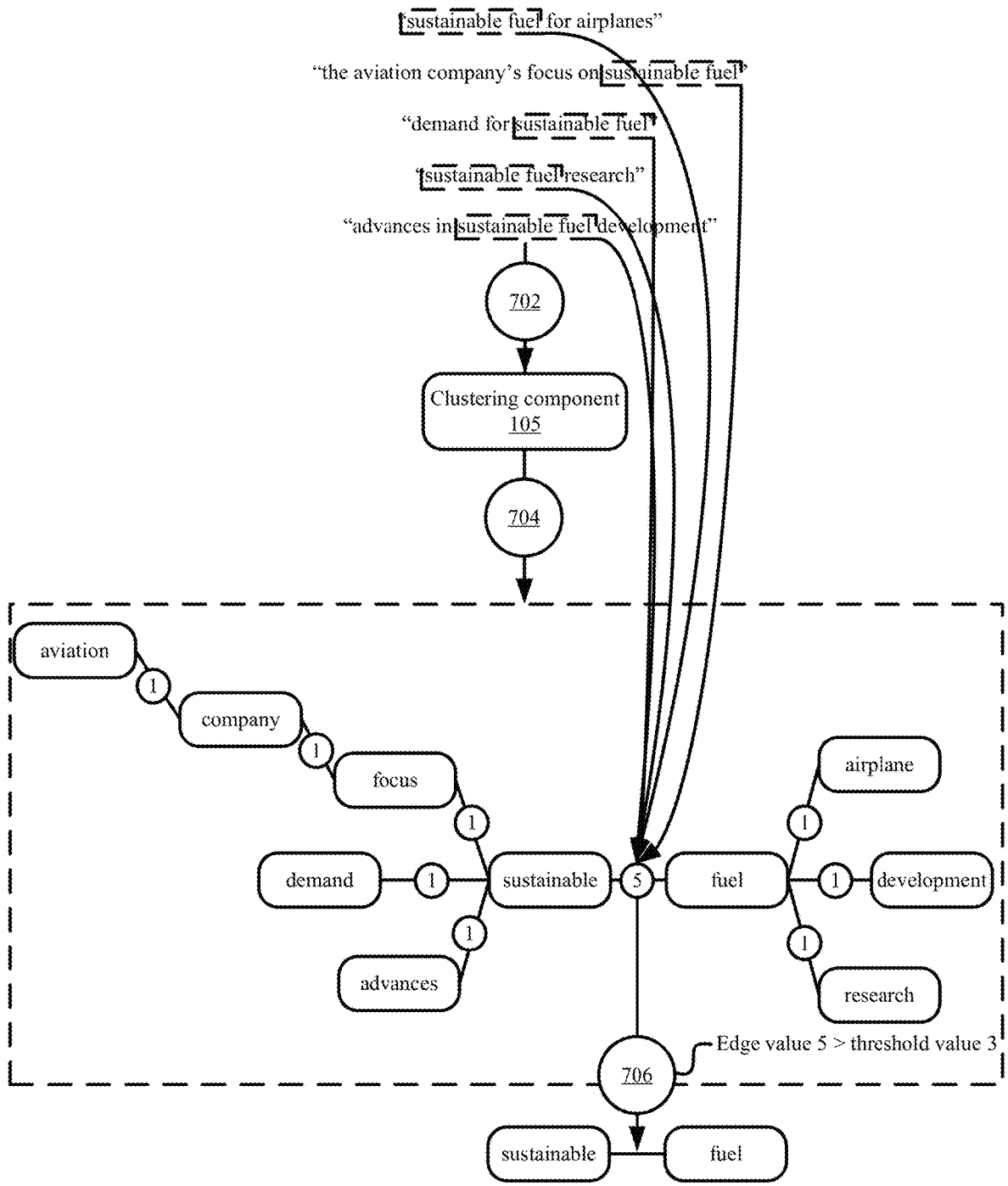
FIG. 7 illustrates an example of determining a relevant noun-phrase from a directional graph representation of a set of extracted noun-phrases in accordance with some embodiments presented herein.

FIG. 7 illustrates an example of determining a relevant noun-phrase from a directional graph representation of a set of extracted noun-phrases in accordance with some embodiments presented herein. The directional graph of FIG. 7 is constructed from a sample set of 5 noun-phrases that may be extracted from different content or from different topic-wise segments of the same content.

Clustering component 105 receives (at 702) the sample set of 5 noun-phrases. Clustering component 105 generates (at 704) a node for each noun in the set of noun-phrases, generates an edge to connect the nodes that correspond to a neighboring or adjacent pair of nouns in the set of noun-phrases, and increments the edge value for every recurrence of a neighboring or adjacent pair of nouns found in the set of noun-phrases.

In FIG. 7, the threshold for a valid path is set to a value of 3. The path created by the node pair of nouns "sustainable" and "fuel" is the only path within the directional graph that has an edge value greater than the threshold (e.g., 5>3). Accordingly, clustering component 105 determines (at 706) that the noun-phrase "sustainable fuel" is a valid path representing a relevant noun-phrase.

Clustering component 105 selects the constituent phrases of a valid path. With reference to FIG. 7, the valid path is the noun-phrase "sustainable fuel", and the constituent phrases are all of the phrases that include the noun-phrase "sustainable fuel" in combination with other nouns or words. In some such embodiments, the constituent phrases are also classified as relevant noun-phrases because they extend from the valid path of the directional graph.

Every phrase that is associated with or derived from a valid path may not be semantically the same. For instance, the noun-phrase of the valid path may have different meanings in the context of different sentences or when presented in constituent phrases with other nouns or words. In some embodiments, clustering component 105 disambiguates a phrase represented by a particular path by calculating a weighted encoding for each phrase that combines the phrase's encoding with the encoding of its topic. In some embodiments, clustering component 105 averages the phrase encoding vector for each relevant phrase (e.g., the specific noun-phrase and constituent phrases of a valid path) with the associated topic encoding vector to produce a topic phrase encoding vector.

Clustering component 105 analyzes the topic phrase encoding vectors that are obtained from a valid path. Specifically, clustering component 105 determines if the topic phrase encoding vectors form different clusters within the same valid path. The clustering involves detecting additional commonality in the relevant phrases beyond the nouns of the valid path so that the resulting clusters have greater specificity or additional words with which to classify the noun-phrases within the clusters.

Figure 8:
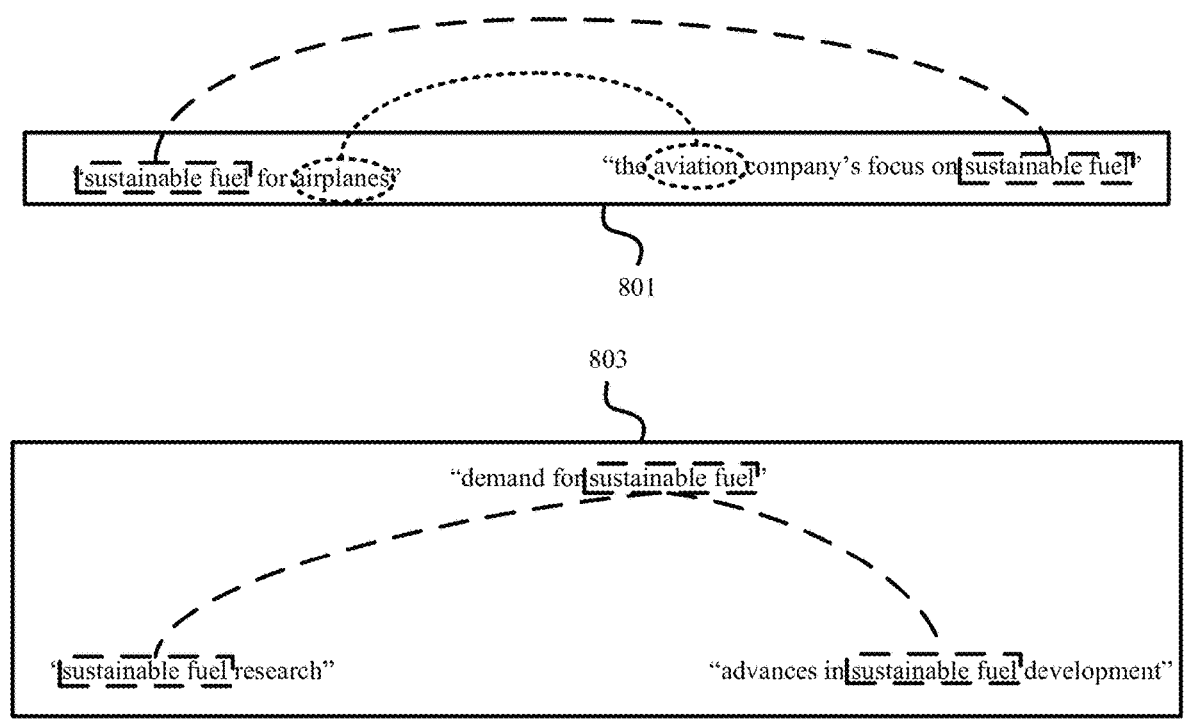
FIG. 8 illustrates an example of dividing phrases that are associated with the same valid path into different clusters in accordance with some embodiments presented herein.

FIG. 8 illustrates an example of dividing phrases that are associated with the same valid path into different clusters in accordance with some embodiments presented herein. Each of the illustrated phrases includes the noun-phrase of the valid path "sustainable fuel". However, first set of the phrases 801 also include common nouns related to aviation (e.g., "planes" and "aviation"), whereas second set of the phrases 803 have no additional commonality and are directed to general interest in the technology of "sustainable fuel". In other words, the topic phrase encoding vectors for each phrase in first set of phrases 801 contain values that indicate additional commonality (e.g., "planes" and "aviation") amongst first set of phrases 801 apart from the commonality of the valid path. This additional commonality allows for the separate clustering of first set of phrases 801 than second set of phrases 803 sharing the same valid path. The additional commonality shared by the phrases of first set of phrases 801 also allows for each phrase of first set of phrases 801 to be defined and/or classified with greater specificity on the basis of the additional commonality which may lead to the generation of additional relationships between established and emerging concepts.

Clustering component 105 may disambiguate between the clusters by assigning an encoding to each cluster. In some embodiments, the encoding for a particular cluster is an average of the topic phrase encoding vectors for each phrase of the particular cluster. The encoding generates a cluster vector. The cluster vector hones the vector representations of the semantic meaning behind the cluster. In other words, the cluster vector includes values that identify the additional commonality shared by the phrases grouped within a first cluster that are not shared by the phrases grouped within a second cluster despite the phrases of the first and second clusters being related on the basis of a common valid path.

Clustering component 105 then performs a clustering of the cluster vectors or the clusters represented by the cluster vectors. Specifically, clustering component 105 groups together the cluster vectors or clusters that share a common noun in order to establish additional relationships between the phrases within each cluster.

For instance, each cluster is associated with a valid path. A first set of clusters may be associated with the same valid path, and a second set of clusters may be associated with different valid paths but share a common noun or word with the valid path of the first set of clusters. Accordingly, even though the first set clusters and the second set of clusters may be derived from different valid paths, the phrase within the clusters may be grouped on the basis of the different valid paths having partially commonality by virtue of the valid paths being related or connected by at least one common noun or word.

Figure 9:
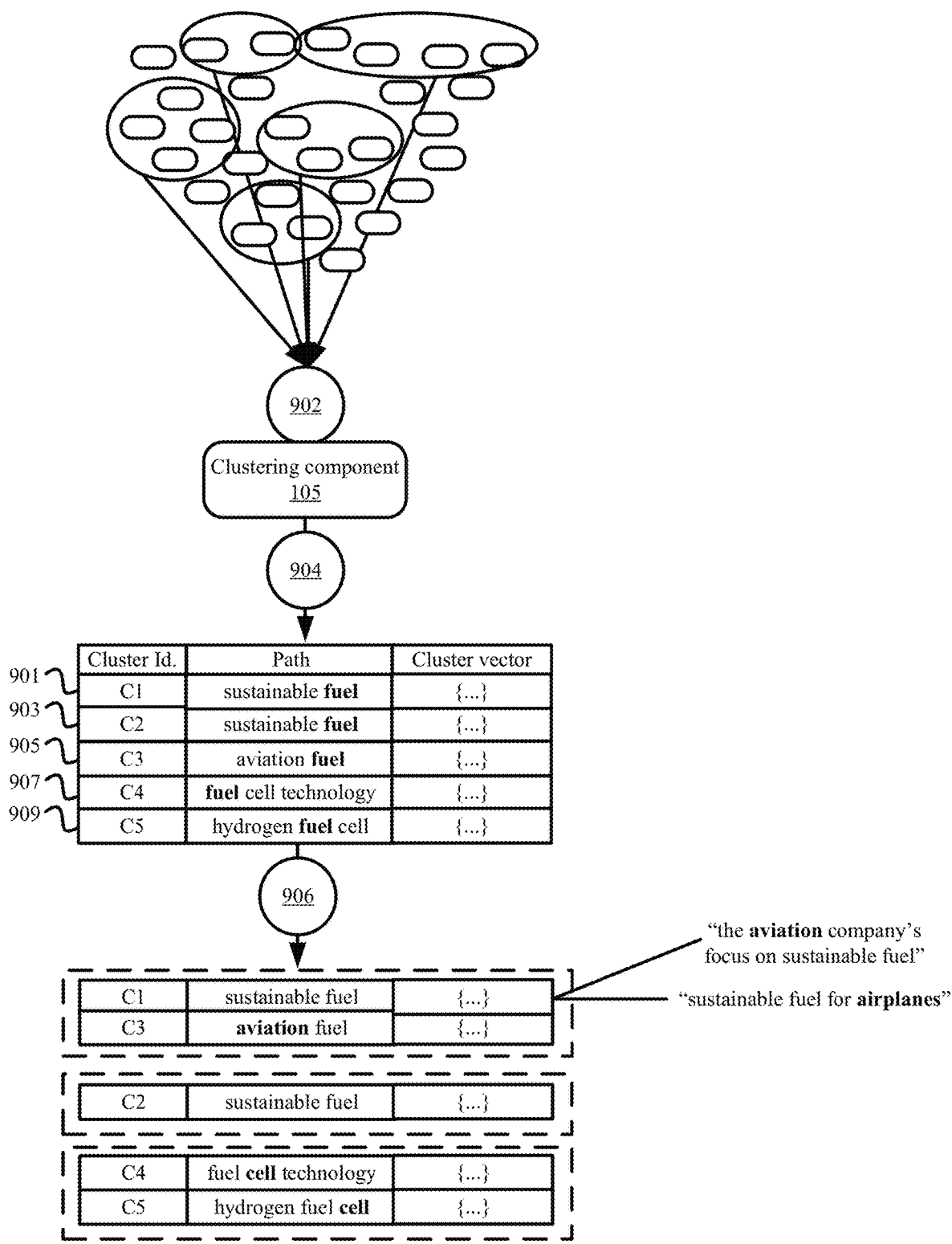
FIG. 9 illustrates the clustering of cluster vectors based on a shared noun in accordance with some embodiments presented herein.

FIG. 9 illustrates the clustering of cluster vectors based on a shared noun in accordance with some embodiments presented herein. To simplify the clustering, the clustering is illustrated based on the wording of the valid paths associated with each cluster rather than the cluster vector values that numerically represent the wording of the valid paths.

Clustering component 105 obtains (at 902) the clusters that were generated for phrases defined with a common valid path and/or based on additional commonality detected amongst the phrases defined with the common valid path. Clustering components 105 first groups (at 904) the clusters that are defined with different but partially related valid paths. A partially related valid path is a path that has at least one noun or word (e.g., "fuel") in common with the different valid paths represented by other grouped (at 904) clusters.

FIG. 9 illustrates the first grouping or clustering (at 904) of first cluster 901 identified with a first cluster identifier, a first valid path, and a first cluster vector, second cluster 903 identified with a second cluster identifier, the first valid path, and a second cluster vector, third cluster 905 identified with a third cluster identifier, a second valid path. and a third cluster vector, fourth cluster 907 identified with a fourth cluster identifier, a third valid path, and a fourth cluster vector, and fifth cluster 909 identifies with a fifth cluster identifier, a fourth valid path, and a fifth cluster vector. First and second clusters 901 and 903 correspond to the clusters generated in FIG. 8 for the same valid path of "sustainable fuel", wherein the phrases of first cluster 901 share the additional commonality of being related to aviation or airplanes, whereas the phrases of second cluster 903 do not have additional commonality for disambiguation from the valid path of "sustainable fuel". Third cluster 905, fourth cluster 907, and fifth cluster 909 are formed based on different sets of phrases that were clustered on the basis of sharing a different valid path (e.g., "aviation fuel", "fuel cell technology", and "hydrogen fuel cell").

Clustering component 105 performs a second grouping or clustering (at 906) based on the first grouping or clustering (at 904) of clusters on the basis of a shared noun or word in their respective valid paths. The second grouping or clustering (at 906) involves combining clusters with different paths that share at least one noun or word and that contains phrases that are semantically related. For instance, the second grouping or clustering (at 906) includes grouping first cluster 901 with third cluster 905 based on first cluster 901 and third cluster 905 having at least one common noun or word in their respective paths and the phrases within first cluster 901 and third cluster 905 being semantically related to airplanes or aviation (e.g., phrases containing the same or related nouns). The second grouping or clustering (at 906) further includes grouping fourth cluster 907 with fifth cluster 909 based on fourth cluster 907 and fifth cluster 909 having at least one common noun or word in their respective paths and the phrases within fourth cluster 907 and fifth cluster 909 being semantically related to fuel cells.

In some embodiments, the second grouping or clustering (at 906) is performed based on the encoded values from the cluster vectors of first cluster 901, second cluster 903, third cluster 905, fourth cluster 907, and fifth cluster 909. Specifically, clustering component 105 identifies values in the cluster vectors of first cluster 901 and third cluster 905 that represent the shared commonality or relationship with respect to airplanes or aviation, and values in the cluster vectors of fourth cluster 907 and fifth cluster 909 that represent the shared commonality or relationship with respect to fuel cells.

In some embodiments, generating the second grouping or clustering (at 906) includes reencoding the cluster vectors of first cluster 901 and third cluster 905 to generate a first group vector representation for that first grouping of clusters, and reencoding the cluster vectors of fourth cluster 907 and fifth cluster 909 to generate a second group vector representation for that second grouping of clusters. A cluster group identifier is assigned to uniquely identify the clusters of a particular cluster group and/or the phrases from the clusters of the particular cluster group.

The resulting groups of clusters or group vector representations produce a different collections of phrases from different paths that each embody a distinct technology, topic, theme, subject, field, or idea that may differ from the topic of the topic-wise segment or valid path associated with the individual phrases. In this manner, emerging concepts search system 100 identifies new relationships between wording for newly detected or previously unseen technologies, topics, themes, subjects, fields, or ideas of emerging concepts and wording for previously detected and seen technologies, topics, themes, subjects, fields, or ideas of established concepts. Clustering component 105 writes the clustering results to a database of emerging concepts search system 100.

Emerging concept generator 107 processes the outputted cluster groups and/or group vector representations generated by clustering component 105, and derives emerging concepts in different technologies, topics, themes, subjects, and/or fields from processing the cluster groups and/or group vector representations. In some embodiments, the derived emerging concepts correspond to terms, ideas, or words that are new or previously unseen and that have been linked via the clustering to terms, ideas, or words of established concepts that are known, previously seen, and/or have trended in the past. In other words, emerging concept generator 107 associates and links terms of established concepts to terms of emerging concepts that have been determined to relate, are relevant to, or are otherwise associated with the established concepts based on the clustering results and the merging of different relevant phrases from different clusters containing wording of established concepts and emerging concepts.

Emerging concept generator 107 analyzes the wording from the phrases of the different group vector representations that have been clustered and/or grouped together and that have been identified with a common identifier. The analysis includes distilling the multitude of phrases within a particular grouping to an emerging concept. The emerging concept is a single distinct phrase that represents the semantic information of the entire group of phrases.

To generate the emerging concepts, emerging concepts search system 100 trains emerging concept generator 107 to choose a phrase from each cluster group based on concision and the phrase encoding's proximity to the cluster group center. For instance, the phrases from a particular cluster group may be provided as training input to a neural network. The neural network creates synapses based on the values within the encoded vector representation of each phrase from each cluster of the cluster group to determine the particular phrase or wording that most accurately represents all of the phrases within that cluster group. Accordingly, emerging concept generator 107 selects a particular phrase from a clustered grouping of phrases as the emerging concept that is associated with established concepts represented by other phrases from that clustered grouping of phrases.

Additionally, emerging concept generator 107 may link the emerging concepts to entities that were referenced in the passages or extracted phrases of the content mentioning those emerging concepts. For instance, emerging concept generator 107 may associate a first emerging concept to a first set of companies that were referenced in the content with the phrases of the first emerging concept, and may associated a second emerging concept to a second set of companies that were referenced in the content with the phrases of the second emerging concept.

Since each of the phrases, including the phrases that identify an emerging concept, are linked to or contain the identifier for the content from which that phrase was extracted from, emerging concepts search system 100 is able to link the emerging concept to the content that provides relevant information around that emerging concept including the entities developing, advancing, and/or that are involved in that emerging concept.

Search engine 109 leverages the relationships created between the retrieved content, extracted phrases, and cluster groups to identify the emerging concepts, the content referencing the emerging concepts, and the entities most integral to those emerging concepts in response to user search queries that include terms, phrases, or other descriptive wording of established concepts. Search engine 109 includes a user interface for receiving the user queries, and for responding to the user queries with the relevant results and/or content.

Figure 10:
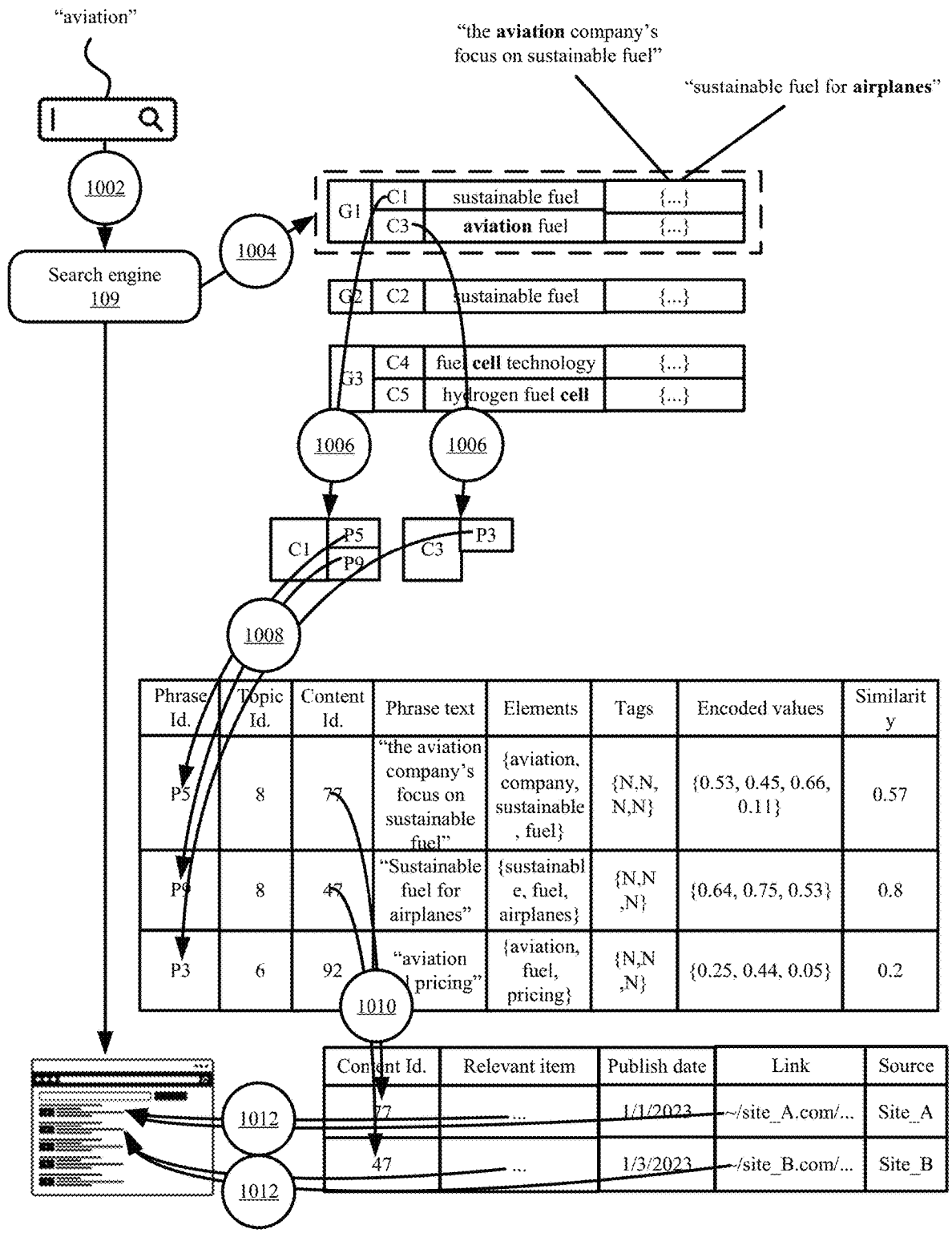
FIG. 10 illustrates an example of generating sample search results for emerging concepts in accordance with some embodiments presented herein.

FIG. 10 illustrates an example of generating sample search results for emerging concepts generated by search engine 109 in accordance with some embodiments presented herein. Search engine 109 receives (at 1002) a user query that identifies a first established concept such as "aviation".

Rather than provide search results and/or content for the most viewed content or most linked to content referencing aviation, search engine 109 presents emerging concepts for new, unpopular, or previously unseen terms, ideas, or phrases that emerging concepts search system 100 has associated with the established concept of aviation. With reference back to the clustering illustrated in FIG. 9, search engine 109 selects (at 1004) the cluster group that includes phrases or paths relating to aviation. In other words, search engine 109 selects (at 1004) the cluster group that includes relevant phrases or paths for emerging concepts that have been linked or connected to the established concept of aviation by emerging concept generator 107, clustering component 105, and/or other components of emerging concepts search system 100.

The selected (at 1004) cluster group is identified with a cluster group identifier (e.g., "G1"). The cluster group identifier is linked to or associated with the cluster identifiers (e.g., "C1" and "C3") for the clusters that have been grouped as part of the selected (at 1004) cluster group. Search engine 109 traverses the cluster identifiers in order to obtain (at 1006) the phrase identifiers (e.g., "P3", "P5", "P9") that are linked to or associated with each cluster identifier. The phrase identifiers that are linked to or associated with a particular cluster identifier identify the specific phrases that are linked to or associated with the particular cluster identified by the particular cluster identifier. In other words, search engine 109 identifies the relevant phrase that were included as part of each identified cluster of the selected (at 1004) cluster group.

Search engine 109 retrieves (at 1008) the data structure for the phrase encoding vector of each phrase identified by the obtained (at 1006) phrase identifiers. FIG. 6 illustrated an example data structure for the phrase encoding vector of a phrase that is identified and/or accessible with a phrase identifier.

Based on the encoded values and similarity scores defined for the phrase encoding vectors in the retrieved (at 1008) data structures, search engine 109 differentiates the phrases of the emerging concepts from the phrases of the established concepts that were clustered to form the selected (at 1004) cluster group and establish the link between the established concept of aviation and the detected emerging concept of sustainable fuel.

The retrieved (at 1008) data structures contain the content identifier (e.g., "77" and "47") for the item of content from which the identified phrases of the emerging concepts were extracted from. Accordingly, search engine 109 traverses the content identifiers from the retrieved (at 1008) data structures of the phrase encoding vectors to obtain (at 1010) the database records for the content instance identified by the content identifier. FIG. 2 illustrated an example database record for the content instance. The database records include the content identifier for the instance of content that includes the relevant phrases for the emerging concepts associated with the cluster group, and also include the content text, publish date, link to the original site, and source identifier.

Search engine 109 presents (at 1012) results for emerging concepts identified for the established concept search query from the obtained (at 1010) database records for the content instances that included the relevant phrases for the emerging concepts associated with the cluster group that was identified based on the established concept search query for aviation. Specifically, the presented (at 1012) results may include the URLs or links for the content instance identified in the obtained (at 1010) database records and/or the extracted relevant phrases that describe the emerging concept from the obtained (at 1010) database records or retrieved (at 1008) phrase encoding vector data structures. In this example, search engine 109 populates the search interface with results for the emerging concept of "sustainable fuel" that emerging concepts search system 100 linked to the search query for the established concept of "aviation". As shown in FIG. 10, search engine 109 presents (at 1012) the content that references the emerging concepts despite that content not being linked to by "important" sites, not being popular (e.g., not receiving a threshold number of visits, not being referenced on other sites, etc.), not containing the actual search terms, and/or otherwise not having a well-defined or established relationship to aviation.

As another example, the emerging concepts presented by search engine 109 for the established concept of transportation may include content, entities, and/or links for Mars exploration, Mars colonization, Ion engines, solar sails, and other concepts that have not received wide-spread recognition and/or attention in the field of transportation. The search results produced by emerging concepts search system 100 dynamically change as emerging concepts become established concepts, obsolete, or part of the public discourse over a period of time. For instance, the same search query for transportation may have generated results for the emerging concept of magnetic levitation in the 1960s when the first research papers began mentioning the concept, or for the emerging concept of ride-sharing in 2009 when the first companies working on ride-sharing came into existence and when ride-sharing was a nascent term that was not trending or part of the public discourse.

Figure 11:
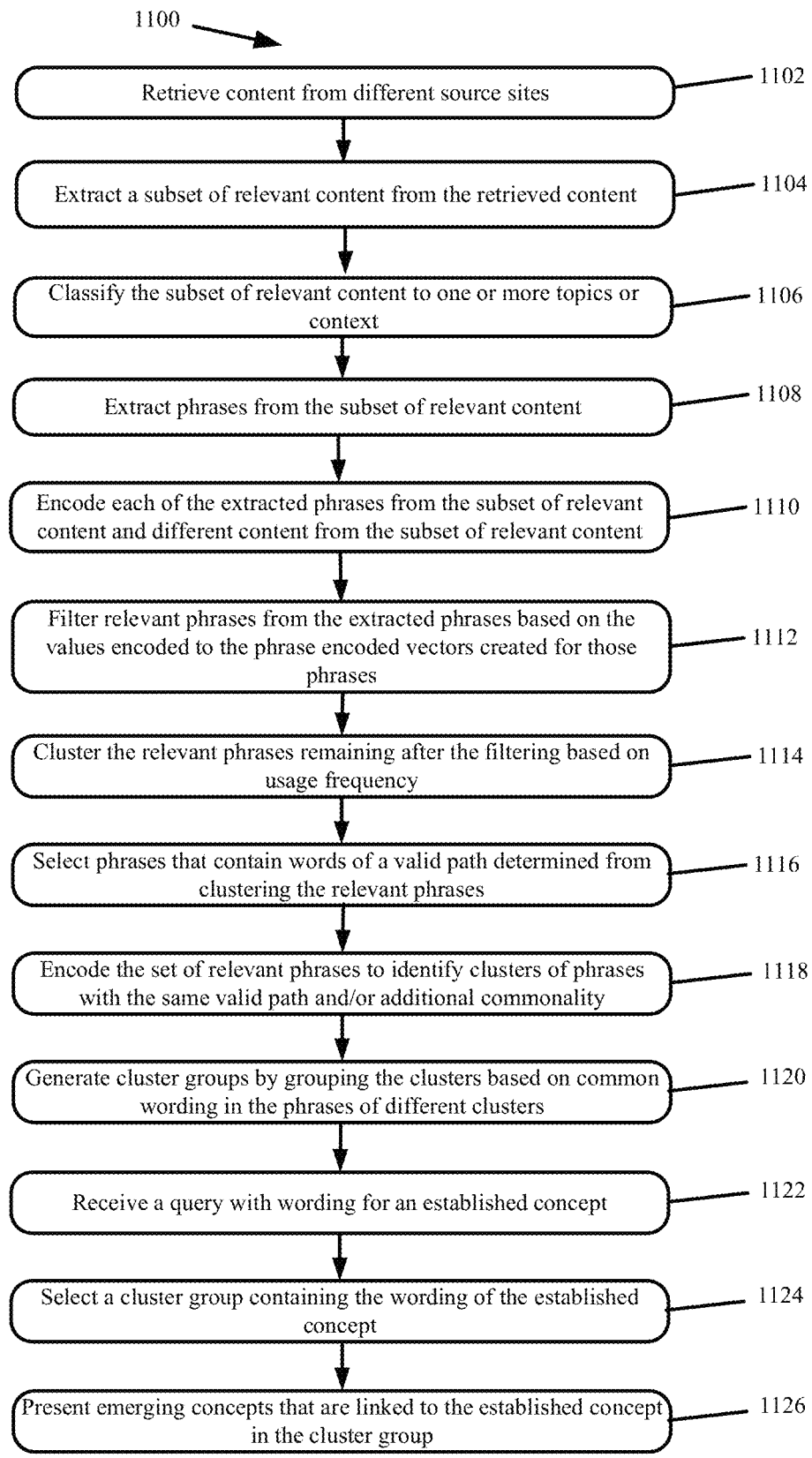
FIG. 11 presents a process for providing emerging concepts as search results to queries identifying established concepts in accordance with some embodiments presented herein.

FIG. 11 presents a process 1100 for providing emerging concepts as search results to queries identifying established concepts in accordance with some embodiments presented herein. Process 1100 is implemented by emerging concepts search system 100 with different operations of process 1100 being implemented by different components of emerging concepts search system 100.

Process 1100 includes retrieving (at 1102) content from different source sites. The retrieved content may be targeted to include content or source sites that generated content about specific technologies, developments, topics, themes, subjects, or terms focused on emerging and established concepts. The content may include text, images, audio, video, and/or other multimedia elements.

Process 1100 includes extracting (at 1104) a subset of relevant content from the retrieved (at 1102) content. Extracting (at 1104) the subset of relevant content using regular expressions, NLP techniques, and image processing techniques to differentiate body or subject text, images, audio, and/or video from advertisements, user interface elements, extraneous text, images, audio, and/or video, and/or other elements within the content that are immaterial to the topic or subject of the content.

Process 1100 includes classifying (at 1106) the subset of relevant content to one or more topics or context. In some embodiments, emerging concepts search system 100 uses a trained segmentation model or other neural network to scan the text within a passage, determine when the topic changes within the text, and classify the text (e.g., clauses, sentences, or paragraphs) that pertain to a common topic or context. In some embodiments, classifying (at 1106) the subset of relevant content involves identifying the boundaries where the topic transition occurs. In some other embodiments, classifying (at 1106) the subset of relevant content involves associating a topic label or identifier that identifies the topic or content of the classified text.

Process 1100 includes extracting (at 1108) phrases from the subset of relevant content. Emerging concepts search system 100 using a constituency parser to partition text from the subset of relevant content in noun-phrases, verb-phrases, and/or other phrases.

Process 1100 includes encoding (at 1110) each of the extracted (at 1108) phrases from the subset of relevant content and different content from the subset of relevant content. Encoding (at 1110) the phrases includes generating a phrase encoded vector that quantifies the semantic similarity between the words in the phrase and/or the phrase to the topic of content that the phrase was extracted from. Encoding (at 1110) the content from the subset of relevant content includes generating a topic encoded vector that quantifies the semantic similarity of the phrases that were extracted from that content to the topic that was classified for the content.

Process 1100 includes filtering (at 1112) relevant phrases from the extracted (at 1108) phrases based on the values encoded to the phrase encoded vectors created for those phrases. For instance, emerging concepts search system 100 discards phrases that are determined to be irrelevant to the topic of the source content in response to the values from the phrase encoded vector of a phrase being less than a threshold. The values from the phrase encoded vector of a phrase are less than a threshold when the words of the phrase are not semantically similar to the topic of the source content, and therefore do not contribute to the topic.

Process 1100 includes clustering (at 1114) the relevant phrases remaining after the filtering (at 1112) based on usage frequency. Clustering (at 1114) includes generating a directional graph with nodes that correspond to different nouns, verbs, or other words within each retained relevant phrase, connecting 2 nodes that correspond to nouns, verbs, or other words that are next to one another in a retained relevant phrase, and incrementing the count of an edge connecting 2 nodes based on number of times that the pair of words represented by those connected nodes appears in the set of retained relevant phrases.

Process 1100 includes selecting (at 1116) phrases that contain nouns, verbs, or words of a valid path determined from clustering (at 1114) the relevant phrases. A valid path is two or more connected nodes within the directional graph with connecting edge counts that satisfy a threshold. The selected (at 1116) phrases include a set of the relevant phrases remaining after the filtering (at 1112) that include the sequential wording represented by the two or more connected nodes of a valid path in combination with zero or more other words.

Process 1100 includes encoding (at 1118) the set of relevant phrases to identify clusters of phrases with the same valid path and/or additional commonality. The encoding (at 1118) of the set of relevant phrases includes generating the topic phrase encoding vectors, and grouping different phrases from the set of relevant phrases having the same valid path into clusters associated with additional commonality between the phrases grouped to that cluster. The additional commonality is identified from the values of the topic phrase encoding vectors. For instance, the set of relevant phrases may all include the valid path of "sustainable fuel". The encoding (at 1118) groups a first subset of the set of relevant phrases to a first cluster based on each phrase of the first subset of relevant phrases also including a noun related to aviation, groups a second subset of the set of relevant phrases to a second cluster based on each phrase of the second subset of relevant phrases also including a noun related to "farming", and groups a third subset of the set of relevant phrases to a third cluster based on each phrase of the third subset of relevant phrases not including any additional commonality amongst them beyond the wording of the valid path. The encoding (at 1118) may further include generating a cluster vector for each cluster.

Process 1100 includes generating (at 1120) cluster groups by grouping the clusters based on common wording in the phrases of different clusters. Each cluster contains a phrase of a particular valid path and/or other commonality. The grouping (at 1120) includes generating a cluster group in which two or more clusters are merged into the cluster group by virtue of the phrases from each merged cluster containing a phrase of shared valid path and/or other shared wording, and the phrases from the different merged clusters containing the wording of different valid paths with at least one or more words of the different valid paths being the same or related.

Process 1100 includes receiving (at 1122) a query with wording for an established concept. Process 1100 includes selecting (at 1124) a cluster group containing the wording of the established concept. Process 1100 includes presenting (at 1126) emerging concepts that are linked to the established concept in the cluster group in response to the query. For instance, emerging concepts search system 100 discards the phrases within the cluster group that contain the wording for the established concepts, selects the remaining phrases that contain wording to other valid paths and that are related to the discarded phrases by virtue of having a word other than the queried word of the established concept in common, analyzes the remaining phrases for emerging concepts, and presents (at 1126) the phrases for the emerging concepts, links to the content containing the phrases for the emerging concepts, or the content itself.

Figure 12:
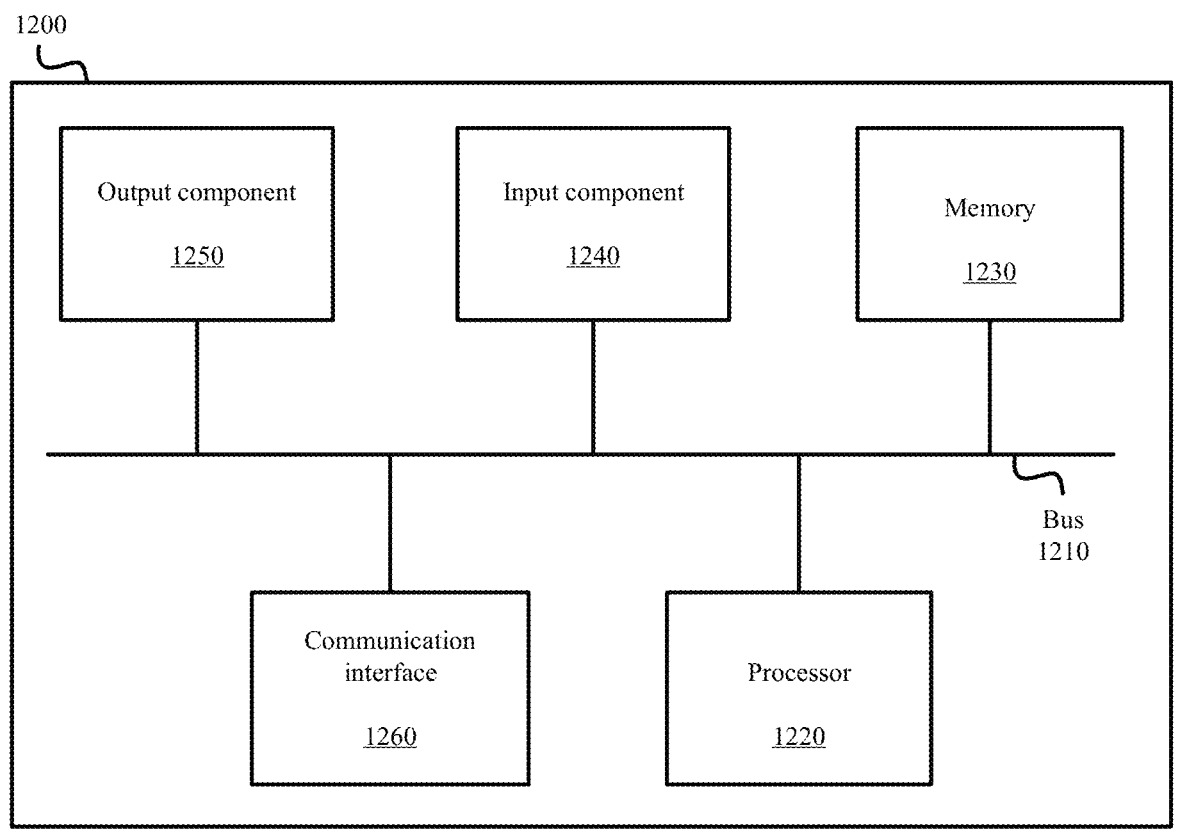
FIG. 12 illustrates example components of one or more devices, according to one or more embodiments described herein.

FIG. 12 is a diagram of example components of device 1200. Device 1200 may be used to implement one or more of the devices or systems described above (e.g., emerging concepts search system 100, content aggregator 101, parser 103, clustering component 105, emerging concept generator 107, search engine 109, and/or other components of emerging concepts search system 100). Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more LEDs, etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   extracting a plurality of phrases from a plurality of content;
   generating a first cluster comprising a first set of phrases from the plurality of phrases based on each phrase of the first set of phrases containing a first common set of words and one or more different words;
   generating a second cluster comprising a second set of phrases from the plurality of phrases based on each phrase of the second set of phrases containing a second common set of words and one or more different words;
   clustering the first cluster and the second cluster to a cluster group based on at least one related word amongst the first common set of words or the one or more different words of the first set of phrases and the second common set of words or the one or more different words of the second set of phrases;
   receiving a search query comprising a particular word in the first common set of words;
   selecting the cluster group based on the first set of phrases in the first cluster of the cluster group comprising the particular word; and
   presenting, in response to the search query, search results that are generated based on a set of content from the plurality of content, wherein the set of content comprises the second set of phrases in the second cluster of the cluster group.

2. The method of claim 1 further comprising:
   classifying the set of content to a particular topic; and
   encoding each phrase from the second set of phrases based on the second common set of words and the one or more different words of the second set of phrases having a semantic similarity to the particular topic.

3. The method of claim 2, wherein encoding each phrase comprises:
generating a vector representation with one or more values for a particular phrase of the second set of phrases, wherein generating the vector representation comprises deriving the one or more values based on semantic similarity between the second common set of words and the one or more different words of the particular phrase to the particular topic.

4. The method of claim 2 further comprising:
filtering a subset of relevant phrases from the second set of phrases based on semantic similarity between the second common set of words and the one or more different words of each phrase from the subset of relevant phrases satisfying a threshold, and semantic similarity between the second common set of words and the one or more different words of other phrases from the second set of phrases not satisfying the threshold.

5. The method of claim 1 further comprising:
generating a directional graph comprising (i) a node for each distinct word from the first common set of words and the one or more different words of the first set of phrases, (ii) an edge that connects two nodes representing a consecutive pair of words in a phrase of the first set of phrases, and (iii) a count that is associated with the edge, wherein the count is based on a number of times that the consecutive pair of words appear in the first set of phrases.

6. The method of claim 1 further comprising:
associating a different content identifier to each content of the plurality of content;
associating a different phrase identifier to each phrase of the first set of phrases and the second set of phrases;
linking the phrase identifier for a particular phrase of the second set of phrases to the content identifier of a particular content comprising the particular phrase; and
wherein presenting the search results comprises:
determining that the phrase identifier for the particular phrase of the second set of phrases is linked to the content identifier of the particular content; and
presenting one or more of the particular content or a link to the particular content as part of the search results.

7. The method of claim 1 further comprising:
associating a different phrase identifier to each phrase of the first set of phrases and the second set of phrases;
linking the phrase identifier for each phrase of the first set of phrases to a first cluster identifier of the first cluster, and the phrase identifier for each phrase of the second set of phrases to a second cluster identifier of the second cluster; and
wherein presenting the search results comprises:
retrieving a particular phrase of the second set of phrases in response to the phrase identifier of the particular phrase being linked to the second cluster identifier of the second cluster; and
presenting the particular phrase as part of the search results.

8. The method of claim 1, wherein presenting the search results comprises:
determining that the first cluster of the cluster group is directed to an established concept;
determining that the second cluster of the cluster group is directed to an emerging concept and that the emerging concept is linked to the established concept; and
defining the search results based on the emerging concept being linked to the established concept.

9. The method of claim 1, wherein clustering the first cluster and the second cluster to the cluster group comprises:
linking an established concept associated with the first cluster to an emerging concept associated with the second cluster.

10. The method of claim 1 further comprising:
dividing the second cluster into a third cluster based on a first subset of phrases from the second set of phrases containing the second common set of words and the one or more different words of the first subset of phrases containing an additional commonality; and
dividing the second cluster into a fourth cluster based on a second subset of phrases from the second set of phrases containing the second common set of words, and the one or more different words of the second subset of phrases containing no additional commonality.

11. The method of claim 10, wherein clustering the first cluster and the second cluster to the cluster group comprises:
linking the first cluster and the third cluster to a first cluster group based on the additional commonality being related to a first word of the first common set of words or the one or more different words of the first set of phrases; and
linking the first cluster and the fourth cluster to a second cluster group based on a second word of the first common set of words or the one or more different words of the first set of phrases being related to one word in the second common set of words of the second subset of phrases.

12. The method of claim 11,
wherein selecting the cluster group comprises selecting the first cluster group in response to the particular word of the search query being related to the first word and the additional commonality; and
wherein presenting the search results comprises presenting a subset of the search results that is derived from the first subset of phrases and that exclude search results derived from the second subset of phrases.

13. The method of claim 1 further comprising:
dividing, with a segmentation model, a particular content from the plurality of content to a plurality of segments based on different topics detected in the particular content.

14. The method of claim 13, wherein extracting the plurality of phrases comprises:
extracting a first group of phrases from a first segment of the plurality of segments, and a second group of phrases from a second segment of the plurality of segments;
filtering the first group of phrases to a first subset of phrases based on a semantic similarity between each phrase of the first group of phrases and a first topic associated with the first segment;
filtering the second group of phrases to a second subset of phrases based on a semantic similarity between each phrase of the second group of phrases and a second topic associated with the second segment; and
retaining the first subset of phrases from the first group of phrases and the second subset of phrases from the second group of phrases after said filtering of the first group of phrases and the second group of phrases.

15. A system comprising:
one or more hardware processors configured to:
- extract a plurality of phrases from a plurality of content;
- generate a first cluster comprising a first set of phrases from the plurality of phrases based on each phrase of the first set of phrases containing a first common set of words and one or more different words;
- generate a second cluster comprising a second set of phrases from the plurality of phrases based on each phrase of the second set of phrases containing a second common set of words and one or more different words;
- cluster the first cluster and the second cluster to a cluster group based on at least one related word amongst the first common set of words or the one or more different words of the first set of phrases and the second common set of words or the one or more different words of the second set of phrases;
- receive a search query comprising a particular word in the first common set of words;
- select the cluster group based on the first set of phrases in the first cluster of the cluster group comprising the particular word; and
- present, in response to the search query, search results that are generated based on a set of content from the plurality of content, wherein the set of content comprises the second set of phrases in the second cluster of the cluster group.

16. The system of claim 15, wherein the one or more hardware processors are further configured to:
- classify the set of content to a particular topic; and
- encode each phrase from the second set of phrases based on the second common set of words and the one or more different words of the second set of phrases having semantic similarity to the particular topic.

17. The system of claim 16, wherein encoding each phrase comprises:
- generating a vector representation with one or more values for a particular phrase of the second set of phrases, wherein generating the vector representation comprises deriving the one or more values based on semantic similarity between the second common set of words and the one or more different words of the particular phrase to the particular topic.

18. The system of claim 16, wherein the one or more hardware processors are further configured to:
- filter a subset of relevant phrases from the second set of phrases based on semantic similarity between the second common set of words and the one or more different words of each phrase from the subset of relevant phrases satisfying a threshold, and semantic similarity between the second common set of words and the one or more different words of other phrases from the second set of phrases not satisfying the threshold.

19. The system of claim 15, wherein the one or more hardware processors are further configured to:
- generate a directional graph comprising (i) a node for each distinct word from the first common set of words and the one or more different words of the first set of phrases, (ii) an edge that connects two nodes representing a consecutive pair of words in a phrase of the first set of phrases, and (iii) a count that is associated with the edge, wherein the count is based on a number of times the consecutive pair of words appear in the first set of phrases.

20. A non-transitory computer-readable medium storing program instructions that, when executed by one or more hardware processors, cause a search system to perform operations comprising:
- extract a plurality of phrases from a plurality of content;
- generate a first cluster comprising a first set of phrases from the plurality of phrases based on each phrase of the first set of phrases containing a first common set of words and one or more different words;
- generate a second cluster comprising a second set of phrases from the plurality of phrases based on each phrase of the second set of phrases containing a second common set of words and one or more different words;
- cluster the first cluster and the second cluster to a cluster group based on at least one related word amongst the first common set of words or the one or more different words of the first set of phrases and the second common set of words or the one or more different words of the second set of phrases;
- receive a search query comprising a particular word in the first common set of words;
- select the cluster group based on the first set of phrases in the first cluster of the cluster group comprising the particular word; and
- present, in response to the search query, search results that are generated based on a set of content from the plurality of content, wherein the set of content comprises the second set of phrases in the second cluster of the cluster group.

* * * * *